Aug. 9, 1960  K. W. MAIER  2,948,529
BUFFER DEVICE

Filed March 24, 1958  2 Sheets-Sheet 1

INVENTOR.
KARL W. MAIER
BY

United States Patent Office 2,948,529
Patented Aug. 9, 1960

2,948,529
BUFFER DEVICE
Karl W. Maier, Cranberry Lane, Cheshire, Conn.
Filed Mar. 24, 1958, Ser. No. 723,308
7 Claims. (Cl. 267—9)

The present invention relates to buffer or shock absorber devices and, in particular, to such devices having structural elements so arranged that they can be varied readily to provide an extremely wide range of damping rates in the device. That is, in one arrangement of the device, a particular damping rate may be achieved while with a relatively simple change of an element of the device, a different damping rate may be set.

The characteristic of a buffer is defined usually as the ratio of $Q'/Q$ expressed in percent and referred to as the "mechanical rate of efficiency." Here Q represents the compressive force applied to the device by a mass being buffered while $Q'$ represents the force with which the buffer mechanism responds or reacts in extension while returning to its initial condition.

Sometimes the term "damping rate" is utilized. This language is defined as $1-Q'/Q$ expressed in percent. For purposes of describing and claiming the present invention the term "damping rate" will be used.

A particular feature of the invention is the provision of a buffer mechanism or shock absorber whose design can be readily varied to provide damping rates ranging from 0 to almost 100 percent.

A further feature of the invention is the provision of a simple buffer device.

A still further feature of the invention is the provision of a low cost yet dependable buffer device requiring no maintenance.

A further feature of the invention is the provision of a buffer device utilizing conventional coil springs and embracing a generally spiral brake shoe.

A further feature of the invention is the provision of structure in buffer devices operative to effect maximum energy absorption in minimum volume.

A buffer device embracing certain features of the present invention may comprise a cylindrical housing for receiving a recuperating spring means, a brake assembly disposed in the housing, said brake assembly comprising an inner helical spring and an outer helical spring carried by the inner spring, said outer spring including at least one full turn or coil and operative to make frictional contact with the internal surface of the cylinder so as to define a helical brake shoe bearing upon said surface.

Other features and advantages of the present invention will become more apparent from the succeeding specification when read in conjunction with the appended drawings, in which.

Figure 1:
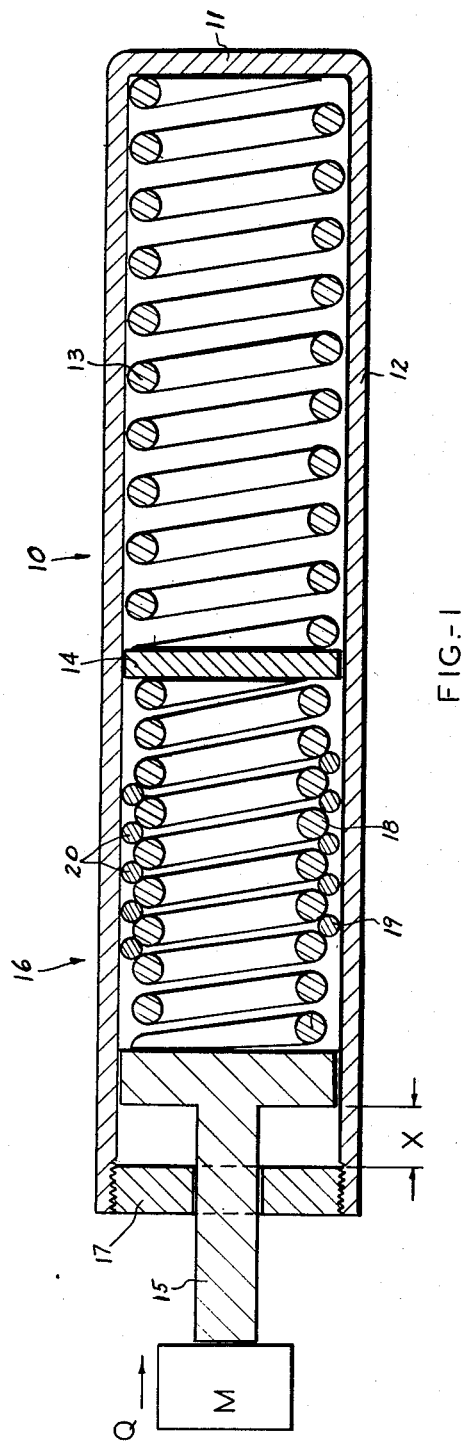
Fig. 1 is a longitudinal, mid-sectional view of a buffer device embracing the principles of the present invention.

Referring now to the drawings, there is shown a cylindrical housing 10 having an end wall 11 and a side wall 12. Coil spring 13, disposed within the housing 10 and hereinafter referred to as a recuperating spring means, is maintained under slight compression by an intermediate washer 14. The washer, in turn, is held snugly against the spring 13 by a brake assembly indicated generally by the reference numeral 16. The brake assembly, held within the housing by a plunger 15 and a cap 17 in threaded engagement with the housing 10, comprises an inner coil spring 18 and an outer coil spring 19. The outer spring 19 may sometimes be referred to as a helical brake shoe comprising a plurality of turns or coils 20. The outer spring has free ends and although it is carried by the inner spring, it is not secured thereto in rigid fashion. In fact, the only factor limiting the relationship between the inner and outer springs is that the spacing between the turns of the inner spring and the gauge of the rod or wire used to make both springs must be selected so as to prevent the outer spring from slipping inside the inner spring as will become more apparent hereinafter.

Although the outer spring or helical brake shoe is shown consisting of four continuous or connected turns or coils 20—20, it is entirely within the contemplation of the present invention, in fact, it is a feature of the invention to vary the design of the buffer device to utilize one or a plurality of turns 20 in designing the device.

Furthermore, the cross sectional conformation of the rod or wire stock from which coil spring 18 and the spring 19 are fabricated may take a variety of forms to achieve any desired frictional and force transfer characteristics.

Figure 3:
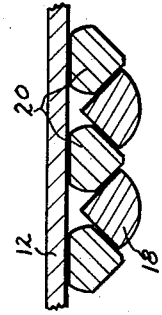
Fig. 3 is a view similar to Fig. 2 showing variations in cross-sectional conformation of the inner and outer spring elements.
Figure 4:
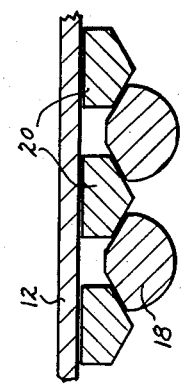
Fig. 4 is a showing of a still further variation in cross-sectional configuration of the elements of the braking assembly.
Figure 2:
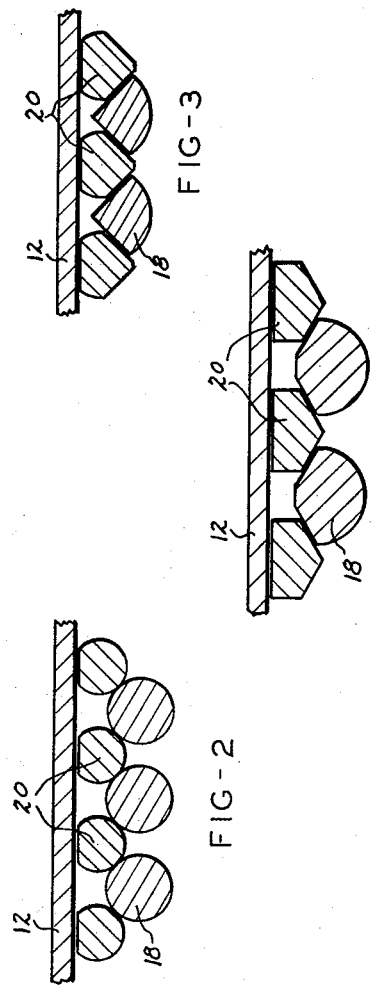
Fig. 2 is a view of a portion of the showing of Fig. 1, somewhat enlarged, illustrating the outer spring or helical brake shoe formed with a flat so as to effect a real contact with the braking surface.

An example of several of such shapes are shown in Figs. 2, 3 and 4.

Operation

Figure 5:
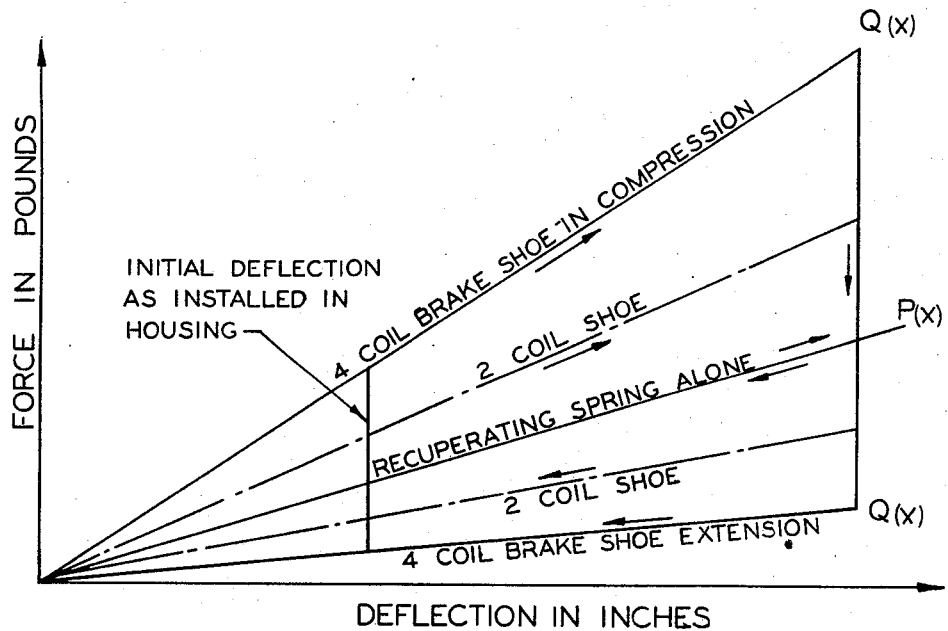
Fig. 5 is a graphic representation of the characteristics of the buffer mechanism showing values of force in pounds plotted against deflection in inches and comparing a four turn or coil brake shoe with a two coil arrangement.

Assume that the buffer device is fixed and that a mass M in motion in the direction shown exerts a compressive force Q upon the device effective to deflect the plunger 15 through $x$ inches as shown graphically in Fig. 5. Coil spring 13 immediately offers resistance to the compressive load so that the brake assembly 16 is also placed under compression. In compressing the brake assembly, coil spring 18 is first compressed and is operative to develop a camming action effective to force or squeeze the coils or turns 20 of spring 19 radially outwardly against the internal surface of the housing 12.

The radial force applied to the coils of the spring 19 in squeezing outwardly develops a frictional force between the spring and the inner surface of the housing as the brake assembly is compressed by the force Q. The frictional force acts as a braking force and cooperates with a force P of the recuperating spring 13 to resist the force Q.

Note that the frictional force generated in each turn 20 of the helical brake shoe 19, in effect, multiplies the compressive resistance or force P of the recuperating spring. In fact, each turn 20 of the spring 19 increases the total frictional resistance developed.

It is to be especially noted, then, that a prime feature of the invention is the relative ease with which one can multiply or increase the buffer action of the buffer device over that of the recuperating spring alone by merely utilizing brake assemblies having increased numbers of turns 20.

Referring again to Fig. 5, it is apparent that after the buffering compression stroke has been completed (the mass being buffered having been brought to rest), the force level of the device suddenly drops and is represented by the function $Q'(x)$.

The curve $Q'(x)$ represents the value of the force P of the recuperating spring modified or reduced by the friction effect of the helical brake shoe for various deflections as the buffer device returns to the normal or initial deflection condition.

Note that when the buffer shifts from a compression stroke to the expansion stroke, the frictional force shifts in a direction opposite to the direction of motion with the result that a great percentage of the reaction force of the recuperating spring is nullified or attenuated.

The amount of attenuation is represented by the area between the curves $Q(x)$ and $Q'(x)$. The energy attenuated is converted into heat.

Referring further to the graph, note the increase in damping rate, i.e., increase in kinetic energy dissipated, in the four coil helical brake shoe over the two coil shoe.

For purposes of comparison of the buffer device of the present invention with the action of a conventional coil spring, note the curve $P(x)$ which shows that the compression and expansion characteristics of a conventional coil spring buffer (such as the recuperating spring alone) are substantially identical wherein the expansion or recuperating stroke is just as energetic as the compression stroke.

Obviously, the brake assembly 16 may be designed to include any desired length of brake shoe 19. That is, the damping rate of the buffer device embracing the principles of the present invention may be changed by merely changing the number of continuous turns or coils making up the brake shoe.

Correspondingly, for purposes of achieving desirable force transfer characteristics or camming action and desirable frictional characteristics, it is intended that the cross sectional configuration of the various coils comprising the springs may be fabricated in a variety of ways, some of which are shown in Figs. 2, 3 and 4.

What is claimed is:

1. A buffer device comprising a housing and a movable plunger cooperating with the housing, a recuperating spring means and a cooperating brake assembly positioned within the housing, said brake assembly being disposed between the spring and the plunger, said brake assembly comprising an inner coil spring and an outer coil spring, said outer coil spring being carried by the inner spring and having at least one turn, said outer coil spring making a relatively snug fit within said housing.

2. The device of claim 1 wherein the coils of the inner spring are spaced apart and the coils of the outer spring are received between said spaced coils.

3. The device of claim 1 wherein each coil of the outer spring is supported by at least two coils of the inner spring.

4. The device of claim 1 above wherein the portions of the respective spring which contact one another are formed with cam surfaces cooperative to drive the coils of the outer spring radially outwards into frictional contact with the housing whenever the inner spring is compressed.

5. The device of claim 1 wherein the recuperating spring means and the brake assembly are disposed in a series.

6. The device of claim 1 wherein the outer surface of the outer spring defines a helical brake shoe and the inner surface of the housing defines a braking surface.

7. A buffer device comprising a housing, a movable plunger received within the housing, recuperating spring means seated within the housing and a cooperating, movable brake assembly positioned within the housing, said brake assembly being disposed between the recuperating spring and the plunger, said brake assembly comprising a pair of nested coil springs, a first of said coil springs operative to contact the housing and having at least one turn, and a second of said coil springs in contact with the plunger and the recuperating spring and being operative by virtue of its nested arrangement with respect to the first spring to cam the first spring radially into contact with the housing whenever the plunger and the brake assembly is moved relative to the housing to compress the recuperating spring.

References Cited in the file of this patent

UNITED STATES PATENTS

| 803,413 | Gallagher | Oct. 31, 1905 |
| 1,624,742 | Kadel | Apr. 12, 1927 |
| 1,968,631 | Bell et al. | July 13, 1934 |

FOREIGN PATENTS

| 439,262 | Germany | Jan. 6, 1927 |
| 377,789 | Italy | Jan. 5, 1940 |